United States Patent
Boariu et al.

(10) Patent No.: US 7,286,845 B2
(45) Date of Patent: Oct. 23, 2007

(54) SYSTEM, AND ASSOCIATED METHOD, FOR SCHEDULING WEIGHTED TRANSMISSIONS FROM MULTIPLE ANTENNAS

(75) Inventors: Adrian Boariu, Irving, TX (US); Balaji Raghothaman, Allen, TX (US)

(73) Assignee: Nokia Corporation, Espoo (FI)

( * ) Notice: Subject to any disclaimer, the term of this patent is extended or adjusted under 35 U.S.C. 154(b) by 652 days.

(21) Appl. No.: 10/611,316

(22) Filed: Jun. 30, 2003

(65) Prior Publication Data

US 2004/0266471 A1   Dec. 30, 2004

(51) Int. Cl.
*H04Q 7/20* (2006.01)
(52) U.S. Cl. ............ 455/522; 455/68; 455/562.1; 455/561; 370/318; 370/252; 375/349; 375/148
(58) Field of Classification Search ............ 455/522, 455/69, 423, 517, 436, 68, 562.1, 561; 375/349, 375/148; 709/229; 370/375, 342, 318, 208, 370/252, 203
See application file for complete search history.

(56) References Cited

U.S. PATENT DOCUMENTS

| | | | |
|---|---|---|---|
| 2003/0045288 A1* | 3/2003 | Luschi et al. | 455/434 |
| 2003/0128658 A1* | 7/2003 | Walton et al. | 370/208 |
| 2004/0120289 A1* | 6/2004 | Hamalainen et al. | 370/335 |
| 2004/0152458 A1* | 8/2004 | Hottinen | 455/423 |
| 2005/0015504 A1* | 1/2005 | Dorne et al. | 709/229 |

OTHER PUBLICATIONS

Derryberry, T., S. Gray, D. Ionescu, G. Mandyam, and B. Raghothaman, "Transmit Diversity in 3G CDMA Systems", IEEE Communications Magazine, Apr. 2002, pp. 68-75, U.S.

International Search Report, PCT/US04,21054, dated Sep. 22, 2005.

* cited by examiner

*Primary Examiner*—Nay Maung
*Assistant Examiner*—Alan Gantt
(74) *Attorney, Agent, or Firm*—Alston & Bird LLP

(57) ABSTRACT

A method for scheduling weighted transmissions from two or more transmit antennas of a base station to each of two or more mobile stations in a closed-loop transmit diversity system, whereby the quantity of power available for data transmission from each transmit antenna is determined and, with respect to each antenna, the power required to transmit data to each mobile station is determined. The number of mobile stations that may be served simultaneously by a base station is determined and, for each combination of respective mobile stations constituting the number of mobile stations that may be served simultaneously, the transmission of data from each transmit antenna to the mobile stations is scheduled to minimize unused power.

20 Claims, 3 Drawing Sheets

SYSTEM, AND ASSOCIATED METHOD, FOR SCHEDULING WEIGHTED TRANSMISSIONS FROM MULTIPLE ANTENNAS

TECHNICAL FIELD

The invention relates generally to wireless telecommunications and, more particularly, to an apparatus and method for selecting which users should be served in a multiple access system when a weighted transmission scheme, such as the transmit adaptive array (TxAA) technique, is used for conveying a data stream.

BACKGROUND

In a wireless telecommunication system, the communication of control signals, voice, data, and the like, are effectuated via a radio communications link established between a base station and one or more mobile stations, such as a mobile telephone, cell phone, personal data assistant (PDA), and the like. The radio communication link includes at least one antenna at the base station and at least one antenna at the mobile station.

Due to a number of environmental factors and conditions, such as fading, multi-path transmissions, and the like, it has been found that the capacity of a system may be increased using transmit diversity in the space domain or in the time domain, i.e., wherein a base station uses two or more spaced-apart antennas, and/or wherein signals transmitted from one antenna are delayed with respect to another antenna, or a combination thereof.

In an open-loop system, in which a base station receives no feedback from a mobile station indicating which antenna of multiple antennas provides the strongest channel of communication, then transmit power is typically apportioned equally between each antenna. However, in a closed-loop system, in which a base station does receive feedback from a mobile station indicating which antenna of multiple antennas provides the strongest channel of communication, then communication efficiency may be improved by assigning greater transmit power to the antenna having the better channel. Transmit power is thus "weighted" differently between the two antennas in an closed-loop system, resulting in improved communication efficiency, but also in an imbalance of transmit power between the antennas. Thus, transmit power that is available for use on an antenna with a weaker channel goes unused and., hence, is wasted.

If there are multiple users competing for access to a limited number of resources, such as base station antennas, then cost functions are implemented to prioritize the sequence in which users are scheduled for transmission of data based on a number of factors, such as service subscribed to, time in queue, and the like. If the transmission of data for a first-priority user does not require the power available for an antenna, then a determination is made whether the remaining power is sufficient to transmit data for one or more additional users next in priority and, if there is, then data for the additional users is transmitted simultaneously with the data for the first-priority user.

A drawback with using the aforementioned cost function is that it may result in a substantial portion of power available on one or more antennas of multiple antennas remaining substantially unused, or underused and, thus, wasted.

In an attempt to use more of the power available on all antennas, data from next-in-priority users that have relatively strong channels on antennas, having power that is not fully utilized, is transmitted from such antennas. While such techniques more efficiently utilize available power on all antennas, there typically still remains substantial unused, and hence wasted, power.

Accordingly, a continuing search has been directed to the development of a system and method for more efficiently utilizing power (i.e., minimizing unused power) available on each antenna of a system having multiple antennas.

SUMMARY

The present invention, accordingly, provides a method for scheduling weighted transmissions from each of two or more transmit antennas of a base station to each of two or more mobile stations in a closed-loop transmit diversity system, whereby the strength of a communication channel from each transmit antenna is determined. Power is then allocated, with reference to a global cost function, to each transmit antenna for the transmission of data to the at least two mobile stations.

In a preferred embodiment of the invention, the global cost function is computed for each allowable combination set of mobile stations that may potentially be served by a base station and the base station antennas. The allowable combination set of mobile stations is defined herein as any number of mobile stations up to and including a predefined maximum number of mobile stations that may be served simultaneously by a base station. The set of mobile stations that provides the minimum global cost function is scheduled to be served by the base station.

In one aspect of the invention, the global cost function is computed with reference to unused power as a variable, wherein unused power is defined herein as the power that is available but not used by one or more base station antennas if data is scheduled for transmission from the one or more base station antennas to a particular set of mobile stations. It is an objective of the invention to use available resources, including the power available for transmission, in the most efficient manner possible. However, this is not always be possible because there are other services that a should take into account when scheduling transmissions. The costs of these services are also included in the global cost function and, thus, as mentioned above, the set of mobile stations that yields the minimum overall cost function is served. The power allocation values used to service the mobile stations from each of base station antennas are those used in the computation of the global cost function.

In another aspect of the invention, a scheduler at a base station may select the users to be served based on a priority function, that is, the set of mobile stations that has the highest priority is served. Such a priority function may be viewed as the inverse of the cost function. Therefore, although the invention is described in terms of minimizing the cost function, alternatively, it may be described in terms of maximizing the priority function. For example, if a set of mobile stations has the priority value x, this value can be easily converted in terms of cost function by setting the value to 1/x.

In another aspect of the invention, the global cost function is calculated as a weighted sum of a cost function that is currently used by a scheduler at a base station, which function does not account for unused power, and another cost function, referred to herein as an unused power cost function, based on unused power. In another aspect of the invention, the power allocated to each transmit antenna and to each mobile station to be served, may have quantized values.

In another aspect of the invention, the weights provided by a closed-loop technique, such as transmit antenna array (TxAA), for use by a scheduler at a base station to allocate power for each transmit antenna, may be quantized.

There are a number of advantages of the invention over the prior art. For example, the present invention minimizes unused power and, hence, wasted power, available at base station antennas. Furthermore, data transmission efficiency, reliability, and transfer rates are enhanced, and unrecoverable costs are minimized.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning radio communications, antennas, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein are performed by a processor such as a microprocessor, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
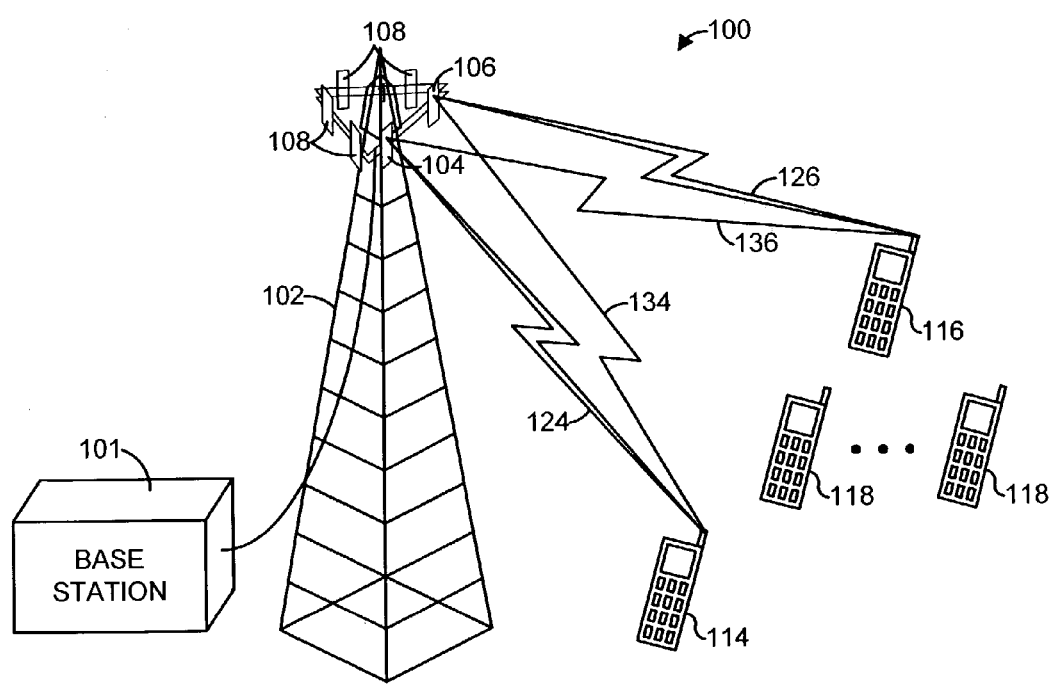
FIG. 1 is a perspective schematic view of a portion of a cellular wireless telecommunication system in which two antennas at a base station are available for effectuating communications with each mobile station assigned to the base station.

Referring to FIG. 1 of the drawings, the reference numeral 100 generally designates a radio communication system in which features of the present invention may be implemented. The system 100 includes a base station 101 having electronic data processing equipment (not shown), such as computers, data memory devices, and the like, effective as a scheduler for scheduling data transmissions, for generally facilitating radio frequency (RF) communications, and the like, as described further below. The base station 101 is connected via a base station antenna tower 102 to transmit antennas 104, 106, and 108 individually oriented thereon for communicating with one or more mobile stations in each sector of a preferably tri-sectored cell serviced by the base station antenna tower 102. While two transmit antennas are depicted for each of three sectors, more than two transmit antennas, as well as receive antennas (which may be either physically integrated with, and/or distinct from, the transmit antennas) may be assigned to each sector serviced by the base station antenna 102, which base station antenna 102 may be configured for servicing more or less sectors than three sectors.

As exemplified in FIG. 1, the antennas 106 and 108 are oriented for servicing mobile stations (not shown) in their respective sectors of the cell, and the antennas 104 and 106 are oriented for facilitating the transmission, weighted between the antennas 104 and 106 preferably in accordance with a closed-loop technique such as transmit adaptive array (TxAA), of signals to, and the reception of signals from, mobile stations 114 and 116, as well as a number of additional mobile stations 118. As described in further detail below, the mobile station 114 is linked to the antenna 104 via a relatively strong radio frequency (RF) forward link 124, and is linked to the antenna 106 via a relatively weak RF forward link 134. The mobile station 116 is linked to the antenna 106 via a relatively strong RF forward link 126, and is linked to the antenna 104 via a relatively strong RF forward link 136. The RF forward links 124, 126, 134, and 136 are closed-loop links wherein the mobile stations 114, 116, and 118 generate feedback through the respective reverse links (the path of which reverse links may be coincident with the forward links if the base station uses the transmit antennas 104 and 106 for reception, or different if the receive antenna(s) (not shown) are different than the transmit antennas) and via the antennas 104 and 106 to the base station 101 indicating the quality of channel each antenna 104 and 106 is providing for the transmission of data to respective mobile stations 114 and 116. While the mobile stations 118 are not shown as linked with the antenna tower 102 and, in particular, with the antennas 104 and 106, the mobile stations 118 would preferably be serviced in accordance with principles set forth herein for the mobile stations 114 and 116 after the mobile stations 114 and 116 are serviced.

Figure 2:
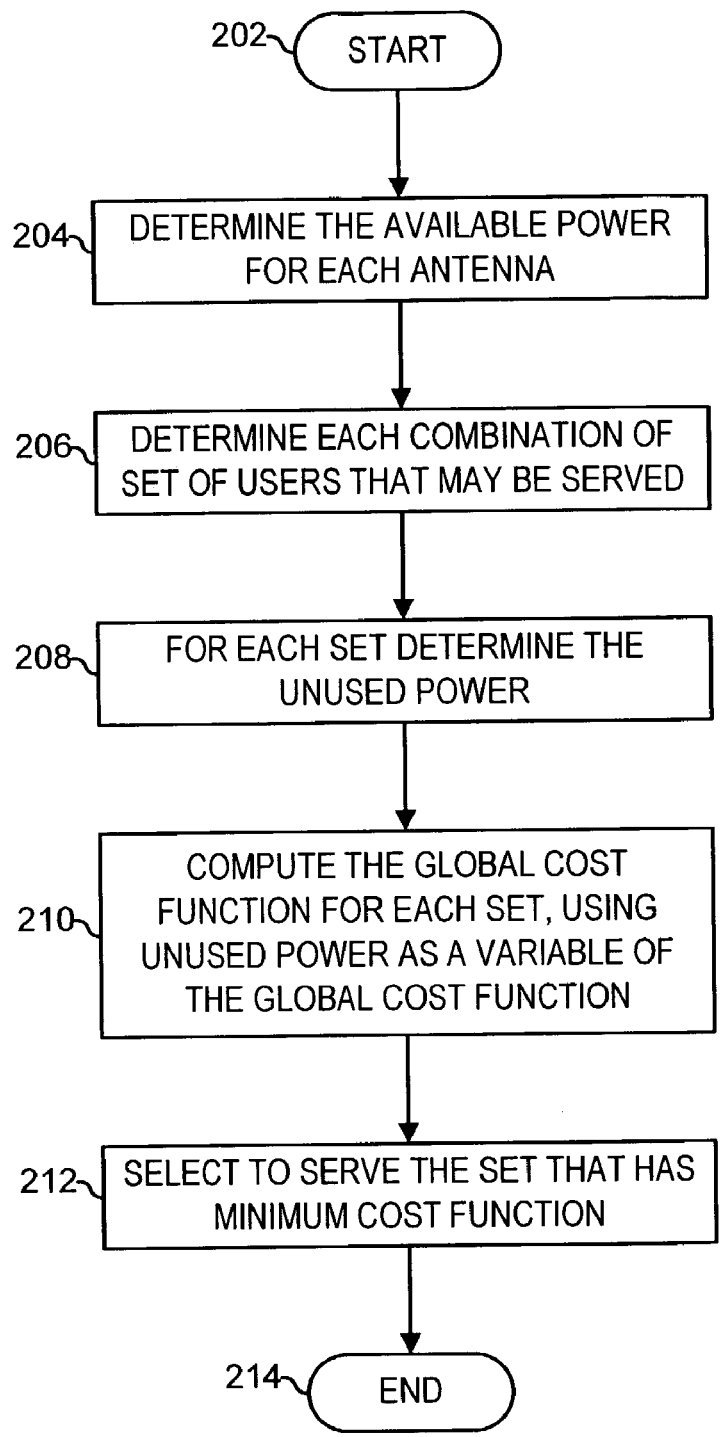
FIG. 2 depicts a flow chart illustrating control logic embodying features of the present invention for performing allocating power between multiple transmit antennas.

FIG. 2 is a flowchart of control logic implemented by the scheduler at the base station 101 for allocating power to transmit antennas, with specific reference to the antennas 104 and 106, in accordance with the present invention. Accordingly, in step 204, the quantity of power available for data transmission from the transmit antennas 104 and 106, are designated herein by $P_{A1}$ and $P_{A2}$.

At step 206, each combination of sets of mobile stations that may be served by the base station 101 is determined. By way of example, the mobile stations 114, 116, and 118 may be considered to constitute a number N of active mobile stations that are served by the base station 101 and antennas 104 and 106 using a closed-loop technique which requires allocation of different values of transmit powers to each of its transmit antennas corresponding to each mobile station selected for data service. An index number, i=1, 2, ..., N is associated with each mobile station 114, 116, and 118 in order to uniquely identify it. Also, it is assumed that a maximum of K (e.g., 2) mobile stations are allowed to be served simultaneously. In accordance with the principles of the present invention, the scheduler at the base station 101 forms all possible sets of mobile station indices. Thus, mobile station sets with a single index, with two indices, etc., up to sets of K indices are formed, resulting in a total of $$J = \sum_{j=1}^{K} \binom{K}{j}$$

distinct possible sets of indices. For purposes of illustration, one such set of indices is designated as S={i1, i2, . . . , iM} comprising M indices, where M≦K. By way of example, and with reference to FIG. 1 the set S may be defined as S={114, 116}.

At step 208, the quantity of unused power is determined for each set of mobile stations. For the set S, the scheduler at the base station 101 preferable computes two quantities. First, a conventional cost function $C_{Pr}(S)$, also referred to conversely as a priority function, that is already being used by processors of base stations, is computed. By way of example, the conventional cost function $C_{Pr}(S)$ accounts for a number of variables, such as a particular service to which a user subscribes, queue time waiting to be served, and the like, but does not include unused power as a variable. Second, an unused power cost function $C_{Pw}(\Delta(S))$ is computed with reference to $\Delta(S)$, the unused power $\Delta$ associated with the set S. Letting $P_{n,A1}$ and $P_{n,A2}$ represent the required transmit powers of the n-th mobile station for the transmit antennas 104 and 106, respectively, derived based on a closed-loop scheme, in order to achieve a desired performance target (e.g., an error rate), the unused power A(S) is preferably computed as follows:

$$\Delta(S)=P_{A1}-(P_{i1,A1}+P_{i2,A1}+ \ldots +P_{iM,A1})+P_{A2}-(P_{i1,A2}+P_{i2,A2}+ \ldots +P_{iM,A2}),$$

with $P_{Aj}-(P_{i1,Aj}+P_{i2,Aj}+ \ldots +P_{iM,Aj}) \geq 0$ for any j=1, 2. If $P_{Aj}-(P_{i1,Aj}+P_{i2,Aj}+ \ldots +P_{iM,Aj}) \leq 0$ for any j=1, 2, then $C_{Pw}(\Delta(S))$ may be set equal to ∞ or to any predetermined value, or the set may be marked as unserviceable, since no antenna may be allocated more power than it is available to the respective antenna.

In step 210, for the considered set S, the global cost function C(S) is preferably computed as:

$$C(S)=\alpha C_{Pr}(S)+(1-\alpha)C_{Pw}(\Delta(S))$$

wherein α is a weighting coefficient, and is preferably less than 1. α is set externally, for example, by an operator of the base station 101 and/or the base station antenna tower 102 associated with the base station.

The steps 208 and 210 described hereinabove are preferably performed for all J (see above) allowable distinct possible sets of mobile stations. In accordance with step 212, the scheduler preferably selects for serving the set of mobile stations that has the minimum value or, alternatively, the substantially minimum value, computed from the global cost function. The values of the power allocation per transmit antenna 104 and 106 for each mobile station, exemplified in FIG. 3 as the mobile stations 114 and 116, in the set that is served are the same as those used for computation of Δ in the global cost function C(S).

Execution of the foregoing global cost function may be streamlined by reducing the search for the set of users that attempt to minimize the global cost function. By way of example, the search may be stopped when Δ is below a prescribed value ε, i.e., when Δ≦ε, wherein ε, for example, may be set by the operator at a desired value. In another example, the search may be streamlined by using quantized values, $Q_{n,A1}$ and $Q_{n,A2}$, of the true required values, $P_{n,A1}$ and $P_{n,A2}$, respectively, with n being any of i1, . . . , iM. In yet another example, the search may be streamlined by quantizing the weights used by the closed-loop technique. For example, the TxAA scheme applied with respect to two transmit antennas may use, with a relatively small penalty in system performance, the weights w1 and w2—used by the closed-loop technique for power allocation—for the weakest and strongest antenna, respectively, may be quantized to 0.2 and 0.8, respectively, i.e., $Q_{n,A1}=0.2*P$ and $Q_{n,A2}=0.8*P$, wherein P is the power which is allocated by the scheduler at the base station.

In accordance with the control logic depicted by FIG. 2, FIGS. 3–6 exemplify, by way of bar charts, allocation of power for voice and data transmissions from the antennas 104 and 106 to the mobile stations 114 and 116.

Figure 3:
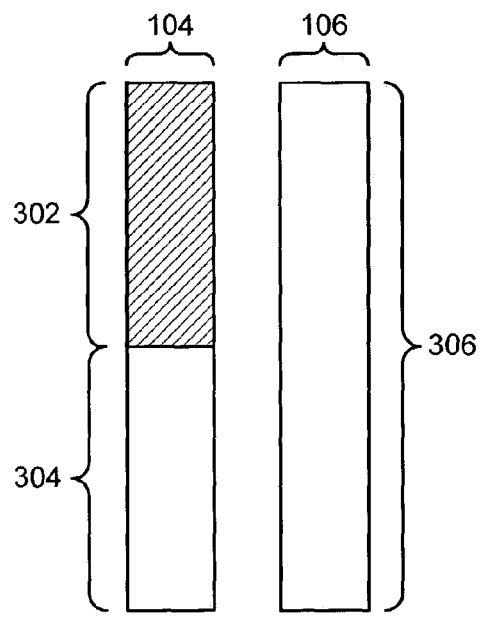
FIG. 3 depicts two bar charts showing the allocation of power across two antennas effectuating legacy voice communication according to prior art schemes.

Referring to FIG. 3, and in accordance with the conventional 1xEV-DV standard, transmission power is allocated between the two antennas 104 and 106 for voice communications with the mobile stations 114 and 116. As shown therein, all voice transmissions (i.e., legacy voice transmissions) are handled via a single transmit antenna 104, and consume a quantity of power 302, leaving for the transmission of data, a quantity of power 304 on antenna 104, and all available power 306 on antenna 106.

Figure 4:
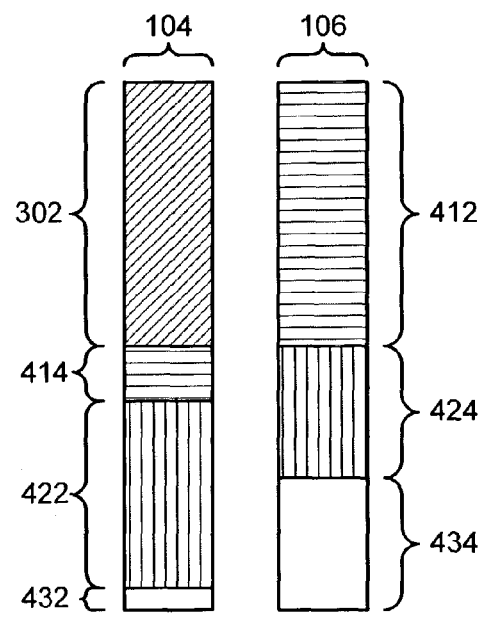
FIG. 4 depicts two bar charts showing the allocation of power across antennas effectuating legacy voice communication and data communication in accordance with features of the present invention.

FIG. 4 exemplifies how power quantities 304 and 306 may be allocated for the transmission of data from the antennas 104 and 106 to two mobile stations 114 and 116, when voice transmission power is allocated pursuant to FIG. 2. Accordingly, the quantities of power 412 and 414 are allocated for data transmission via the respective RF links 126 and 136 to the mobile station 116, and the quantities of power 422 and 424 are allocated for data transmission via the respective RF links 124 and 134 to the mobile station 114. Thus, with respect to the antenna 104, unused power 432 remains, and with respect to the antenna 106, unused power 434 remains. The power quantities 412, 414, 422, and 434 may also be scaled to further utilize power 432 and 434.

As discussed above with reference to FIG. 2, the allocation of the data transmission power quantities 412, 414, 422, and 424 between the antennas 104 and 106, is preferably determined with reference to the conventional cost function, $C_{Pr}$, and, in accordance with principles of the present invention, the unused power cost function, $C_{Pw}$, for determining the cost of unused power.

Figure 5:
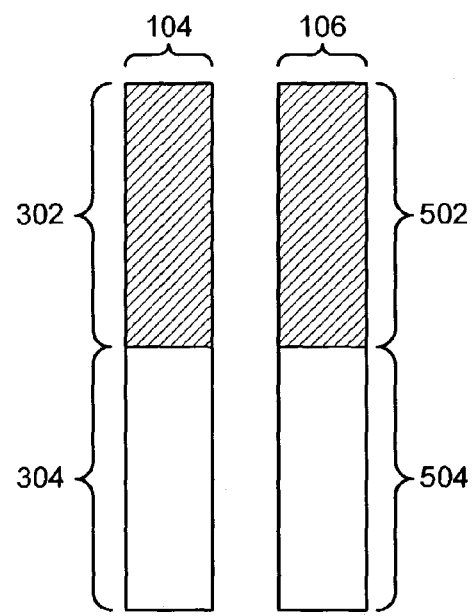
FIG. 5 depicts two bar charts showing the allocation of power across two antennas for voice communication according to a balanced-power transmitting scheme.

FIG. 5 depicts two bar charts showing, in accordance with anticipated open-loop standards for voice transmission, a balanced allocation of power between the two antennas 104 and 106 for voice communications with the mobile stations 114 and 116. As shown therein, voice transmissions are handled via the two transmit antennas 104 and 106, and consume an equal quantity of power 302 and 502, respectively, leaving for the transmission of data, a quantity of power 304 and 504 on antennas 104 and 106.

Figure 6:
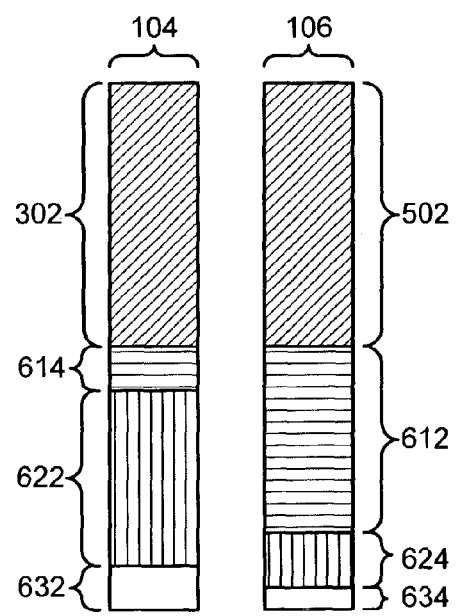
FIG. 6 depicts two bar charts showing the allocation of power across antennas effectuating balanced-power voice communication and data communication in accordance with features of the present invention.

FIG. 6 exemplifies how the power quantities 304 and 504 may be allocated between the antennas 104 and 106 for the transmission of data to the mobile stations 114 and 116, when voice transmission power is allocated pursuant to FIG. 5. Accordingly, the quantities of power 612 and 614 are allocated for data transmission via the respective RF links 126 and 136 to the mobile station 116, and the quantities of power 622 and 624 are allocated for data transmission via the respective RF links 124 and 134 to the mobile station 114. Thus, with respect to the antenna 104, unused power 632 remains, and with respect to the antenna 106, unused power 634 remains. The power quantities 612, 614, 622, and 634 may also be scaled to further utilize power 532 and 534.

The allocation of the data transmission power quantities 612, 614, 622, and 624 between the antennas 104 and 106, is preferably determined with reference to the conventional cost function, $C_{Pr}$, and, in accordance with principles of the present invention, the function, $C_{Pw}$, for determining the cost of unused power Δ, as discussed above with respect to FIG. 4.

By the use of the present invention, unused power and, hence, wasted power, available at the antennas 104 and 106 is minimized. As a further result, data transmission efficiency, reliability, and rates are improved, and unrecoverable costs are minimized.

It is understood that the present invention may take many forms and embodiments. Accordingly, several variations may be made in the foregoing without departing from the spirit or the scope of the invention. For example, the method and system for allocating power by minimizing the unused power at the base station, as described above with respect to FIGS. 3 and 4, may be readily extended to more that two transmit antennas at the base station.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for scheduling weighted transmissions from two or more transmit antennas of a base station to each of two or more mobile stations in a closed-loop transmit diversity system, the method comprising steps of:
    determining the quantity of power available for data transmission from each transmit antenna;
    determining each combination of set of mobile stations that may be served simultaneously by a base station;
    for each combination set, computing unused power $\Delta$ with reference to the quantity of power available for data transmission from each transmit antenna, and the power required to transmit data from each transmit antenna to each respective mobile station in the said set;
    for each of said combination sets of mobile stations, computing a global cost from a global cost function with reference to one or more variables, including said unused power $\Delta$;
    determining the combination set of mobile stations that has a substantially minimum global cost; and
    scheduling the transmission of data from each transmit antenna to the mobile stations which constitute said combination set of mobile stations that has a substantially minimum global cost.

2. The method of claim 1, wherein the step of computing a global cost function further comprises the steps of:
    computing a conventional cost function;
    computing an unused power cost function; and
    computing said global cost function as a weighted sum of said conventional cost function and said unused power cost function.

3. The method of claim 1, wherein the step of computing a global cost function further comprises the steps of:
    computing a conventional cost function $C_{Pr}(S)$;
    computing an unused power cost function $C_{Pw}(\Delta(S))$; and
    computing said global cost function as a weighted sum of said conventional cost function and said unused power cost function according to:

$$C(S)=\alpha C_{Pr}(S)+(1-\alpha)C_{Pw}(\Delta(S)),$$

wherein $\alpha$ is a predetermined value.

4. The method of claim 1, wherein the step of computing a global cost function further comprises the steps of:
    computing a conventional cost function $C_{Pr}(S)$ with reference to at least one of terms of a subscription and time in queue waiting to be served;
    computing an unused power cost function $C_{Pw}(\Delta(S))$; and
    computing said global cost function as a weighted sum of said conventional cost function and said unused power cost function:

$$C(S)=\alpha C_{Pr}(S)+(1-\alpha)C_{Pw}(\Delta(S)),$$

wherein $\alpha$ is a predetermined value.

5. The method of claim 1, wherein said step of determining which combination set of mobile stations has a substantially minimum global cost further comprises determining which combination of mobile stations has a minimum global cost which is less than a predetermined quantity $\epsilon$.

6. The method of claim 1, wherein the step of computing unused power cost $\Delta$ further comprises, for each combination set of mobile stations, the steps of:
    calculating, for each transmit antenna, the difference between the power available to the antenna, and the sum of the power required by each mobile station constituting a combination set; and
    determining the sum of said differences.

7. The method of claim 1, further comprising the steps of:
    determining whether any of said differences is a negative value; and
    upon a determination that any of said differences is a negative value, setting $\Delta$ equal to a predetermined value.

8. The method of claim 1, further comprising the steps of:
    determining whether any of said differences is a negative value; and
    upon a determination that any of said differences is a negative value, marking as unserviceable the combination set of mobiles that produces said negative value.

9. The method of claim 1, wherein the power required by each mobile station is quantized.

10. A base station comprising:
    two or more transmit antennas, each of which comprises a quantity of power available for the transmission of data;
    an electronic data processor adapted for executing program code, said processor being connected to said two or more, transmit antennas and being configured for configuring data for transmission via said two or more transmit antennas;
    a memory connected to said processor, the memory comprising:
    program code for determining each combination of set of mobile stations that may be served simultaneously by a base station;
    program code for computing, for each combination of set of mobile stations, unused power $\Delta$ with reference to the quantity of power, available for data transmission from each transmit antenna, and the power required to transmit data from each transmit antenna to each respective mobile station in the said set;
    program code for computing, for each of said combination sets of mobile stations, a global cost from a global cost function with reference to one or more variables, including said unused power $\Delta$;
    program code for determining the combination set of mobile stations that has a substantially minimum global cost; and program code for scheduling the transmission of data from each transmit antenna to the mobile stations which constitute said combination set of mobile stations that has a substantially minimum global cost.

11. The base station of claim 10, wherein the program code for computing a global cost function further comprises:
program code for computing a conventional cost function;
program code for computing an unused power cost function; and
program code for computing said global cost function as a weighted sum of said conventional cost function and said unused power cost function.

12. The base station of claim 10, wherein the step of computing a global cost function further comprises:
program code for computing a conventional cost function $C_{Pr}(S)$;
program code for computing an unused power cost function $C_{Pw}(\Delta(S))$; and computing said global cost function as a weighted sum of said conventional cost function and said unused power cost function according to:

$$C(S) = \alpha C_{Pr}(S) + (1-\alpha) C_{Pw}(\Delta(S)),$$

wherein $\alpha$ is a predetermined value.

13. The base station of claim 10, wherein the program code for determining which combination of set of mobile stations has a substantially minimum global cost further comprises program code for determining which combination set of mobile stations has a minimum global cost which is less than a predetermined quantity $\epsilon$.

14. The base station of claim 10, wherein the step of computing unused power cost $\Delta$ further comprises, for each combination set of mobile stations:
program code for calculating, for each transmit antenna, the difference between the power available to the antenna, and the sum of the power required by each mobile station constituting a combination set; and
program code for determining the sum of said differences.

15. The base station of claim 10, further comprising:
program code for determining whether any of said differences is a negative value; and
program code for upon a determination that any of said differences is a negative value, setting $\Delta 0$ equal to a predetermined value.

16. The base station of claim 10, further comprising:
program code for determining whether any of said differences is a negative value; and
program code for upon a determination that any of said differences is a negative value, marking as unserviceable the combination set of mobiles that produces said negative value.

17. A closed-loop transmit diversity system comprising:
two or more transmit antennas, each of which comprises a quantity of power available for the transmission of data;
two or more mobile stations, each of said mobile stations being adapted for transmitting indications of the strength of each channel of radio communication established with each of said two or more transmit antennas;
at least one receive antenna configured for receiving from each of said two or more mobile stations said indications of the strength of each channel of radio communication established with each of said two or more transmit antennas;
an electronic data processor adapted for executing program code, said processor being connected to said two or more transmit antennas and to said at least one receive antenna, said processor being configured for receiving said indications from said receive antenna and for configuring data for transmission via said two or more transmit antennas;
a memory connected to said processor, the memory comprising:
program code for determining, based on said indications of channel strength, the quantity of power required to transmit data on each of said two or more transmit antennas;
program code for determining each combination of set of mobile stations that may be served simultaneously by a base station;
program code for computing, for each combination of set of mobile stations, unused power $\Delta$ with reference to the quantity of power available for data transmission from each transmit antenna, and the power required to transmit data from each transmit antenna to each respective mobile station in the said set;
program code for computing, for each of said combination sets of mobile stations, a global cost from a global cost function with reference to one or more variables, including said unused power $\Delta$;
program code for determining the combination set of mobile stations that has a substantially minimum global cost; and
program code for scheduling the transmission of data from each transmit antenna to the mobile stations which constitute said combination set of mobile stations that has a substantially minimum global cost.

18. The system of claim 17, wherein the program code for computing a global cost function further comprises:
program code for computing a conventional cost function;
program code for computing an unused power cost function; and
program code for computing said global cost function as a weighted sum of said conventional cost function and said unused power cost function.

19. The system of claim 17, wherein the program code for determining which combination of set of mobile stations has a substantially minimum global cost further comprises program code for determining which combination set of mobile stations has a minimum global cost which is less than a predetermined quantity $\epsilon$.

20. The system of claim 17, wherein the step of computing unused power cost $\Delta$ further comprises, for each combination set of mobile stations:
program code for calculating, for each transmit antenna, the difference between the power available to the antenna, and the sum of the power required by each mobile station constituting a combination set; and
program code for determining the sum of said differences.

* * * * *